United States Patent [19]
Ferro

[11] 3,880,561

[45] Apr. 29, 1975

[54] BRASSIERE MOLD-FORMING MACHINE

[76] Inventor: Richard A. Ferro, 80 Hunters Dr., Muttontown, N.Y. 11791

[22] Filed: Jan. 23, 1974

[21] Appl. No.: 435,974

[52] U.S. Cl. ............... 425/144; 425/150; 425/155; 425/152; 425/169; 425/412; 425/398; 425/157; 425/383
[51] Int. Cl. .............................................. B29c 3/06
[58] Field of Search ......... 425/398, 412, 383, 451.2, 425/451.9, 445, 152, 144, 169, 150, 157; 264/291, 292, 40

[56] References Cited
UNITED STATES PATENTS

| | | | |
|---|---|---|---|
| 2,680,882 | 6/1954 | Herschmann et al. | 425/398 X |
| 3,167,816 | 2/1965 | Howard et al. | 425/394 X |
| 3,359,600 | 12/1967 | O'Brien et al. | 425/157 |
| 3,561,057 | 2/1971 | Butzko | 425/157 X |
| 3,759,649 | 9/1973 | Tyler | 425/169 X |

*Primary Examiner*—Robert L. Spicer, Jr.

[57] ABSTRACT

In preferred embodiments of the invention, there is provided a brassiere forming machine for molding brassiere garments from fabrics of textile or plastic sheet material placed transversely across the mold plate of a female bottom mold selectively heated to a predetermined temperature and compacted between that female mold and a pneumatically downwardly pressed male mole separately selectively heated to the same or another predetermined temperature, with the respective molds being a part of a small circumscribing fabric-mounting lower and upper plates respectively in aligned opposing relationship each circumscribing plate defining a minimum annular or recessed space in which the respective mold is mounted in order to reduce to a minimum waste fabric to be trimmed from around the molded brassiere once the molding phase is completed, and each mold plate on which the mold and circumscribing plate are mounted being secured by a simple clamping device or easily removed bolt and/or nut at each four corners, for example, for facilitating simple and speedy removal and replacement of the respective mold plate and for intended replacement of a faulty mold and/or substitution therefor of an alternate sized mold in and during a normal course of operation, the respective circumscribing plates being mounted in a spring biased state toward one-another with lower-plate fabric mounting pins extending uprightly through apertures in an upper face of and spaced along the lower circumscribing spring-biased plate, and the upper circumscribing plate being spring-biased positioned in a downwardly directed state at a location below and movable concurrently downwardly with the upper male mold's lower-most point during downward advancement pneumatically thereof during the fabric mold-compression such that the opposing circumscribing plates come into face-to-face engaging contact with one-another before the upper molds lower-most surface contacts the fabric previously laid across the upper faces of the lower mold and lower circumscribing plate and upright pins, the switch circuitry also being such that activation of the pneumatic compression and compacting of the fabric sheet is accomplished solely by simultaneous activation with separate human hands two separate distantly-spaced-apart activation buttons which must be both held in the activation state until such time as the molds become contacted against each other after which the circuitry provides for continued compaction after release of either or both buttons for a predetermined period of time as preset on a timer within the circuitry ranging from zero time to several minutes or the like as might be desired, there being a separate and separately regulatable thermostat for each of the molds and a separate preheat activation switch separate from the pneumatically compacting activation circuit(s), and also there being a light or buzzer signal automatically activated upon the molds reaching the advanced state of compaction thereby informing the operator that the required simultaneous activation of the buttons may be terminated manually by withdrawal of either or both hands from the activation buttons, and also there being provided circuitry for regulation of speed manually for the rate of advancement of the female mold downwardly such that the speed of operation of the machine may be adapted to the individual operator.

20 Claims, 8 Drawing Figures

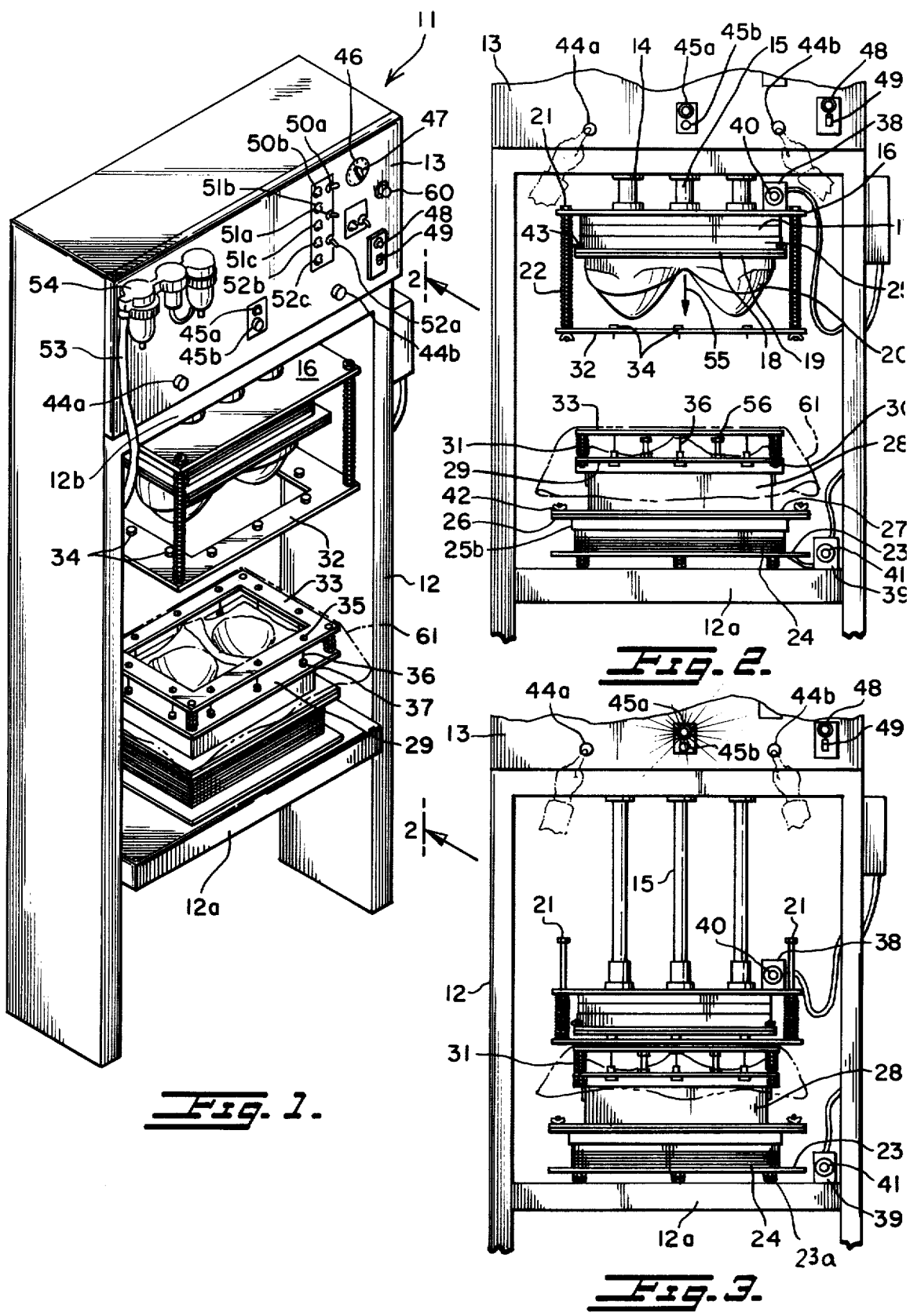

BRASSIERE MOLD-FORMING MACHINE

This invention relates to a novel improved brassiere molding machine for the fabric molding of brassieres from textile or plastic fabric sheets by compaction thereof between heated molds of male and female types pneumatically advanced to compact matedly against one-another.

BACKGROUND OF THE INVENTION

Prior to the present invention there have existed brassiere molding machines generally of the type to which the present invention is directed but with disadvantages and problems insofar as the absence of flexibility for different molds and for operators of different abilities and mentalities and skills, and for conditions of molding as might be desirable for adaptation or adjustment of molding conditions to a particular textile and/or plastic sheet material being molded, and as the improvement in safety of operation and simplicity of operation and manufacture and repair and as the cost of parts and of fabric. The present machine is in contrast to these disadvantages, problems, and short-comings of prior brassiere molding machines.

SUMMARY OF THE INVENTION

Accordingly, objects of the present invention include the obtaining of a novel molding machine which overcomes one or more of the above-noted disadvantages and/or problems and which in addition obtains novel improvements in structure and operation.

Another object is to obtain a brassiere molding machine which is less wasteful of fabric by substantially reducing waste clippings from the molded fabric.

Another object is to obtain a brassiere molding machine which includes a mechanism of mounting the respective opposing molding support plates such that removal and replacement and/or substitution of alternate mold(s) is rendered possible by a simple and speedy operation by an unskilled operator or mechanic.

Another object is to provide for separate and separately controlled heating of each individual mold separate from the other.

Another object is to obtain improved safety in operation by an operator by providing operation maneuvers which substantially obviate the possibility of hazardous practice(s) by an operator.

Another object is to obtain an improved fabric anchoring structure by the molding machine during the compacting operation.

Another object is to provide new flexibility in the speed and in the conditions of operation of the molding operation.

Another object is to provide an improved simplicity of control instrumentation, as well as improved control of the machine during the molding operation.

Another object is to provide for a detachably mountable and insertable timer for facilitating replacement of faulty timer mechanisms in need of repair or replacement.

Another object is to provide for individualization and flexibility and ready varying in number and location of anchoring pin(s) for the fabric sheet placed on the bottom mold prior to molding compaction.

Other objects become apparent from the preceding and following disclosure.

One or more objects of the present invention are obtained by the invention as defined herein.

Broadly the invention may be defined as a novel brassiere fabric sheet forming mold-machine having upper and lower molds pneumatically powered for compaction of the fabric sheet therebetween upon simultaneous actuation of distantly spaced-apart actuation electrical circuit switches which require simultaneous holding of the switches one per opposite hand of the operator, the simultaneous actuation preferably being continued essentially for continued advancement of the mold(s) toward compaction until compaction has occured, thereafter the continuance or maintenance of the compacted state during a prolonged period of time being dependent upon either of continued holding of both actuation buttons or of a presetting of a timer mechanism in circuit of the circuitry such that the period of compaction automatically continues beyond the moment of initial compaction for the selected desired period of compaction, with preferably an indicator such as a light for becoming actuated at the time compaction has begun such that the operator is informed of the fact that manual actuation of both buttons may be ceased because the timer will take-over the maintenance of continued compaction. Whereas prior molding machines included solely complicated and involved mechanism of fixedly mounting the molds on their respective supports and the mold provided little if any secure anchoring structures to reduce the possibility of slipping of the pre-laid fabric sheet over the mold face, and whereas the circumscribing frame structures of the upper and lower mold compacting structure which eventually came together during compaction was large as a standard design through the years, the present invention preferably provides spring-biased plates biased toward one-another upwardly for the bottom plate and downwardly for the upper plate, mold support plates being detachable.

A main and controlling cost saving and also easy fabric-supporting feature is the reduced area of space surrounding each mold as defined within the circumscribing spring-biased plates which in this embodiment serve as the peripheral fabric sheet-supporting lower plate on top of which the fabric is laid and the upper plate which moves downwardly in advance of the lower-most portion of the male mold mounted preferably above the female lower mold. Also there preferably are detachably mountable pins and a multiplicity of optional mounting positions therefor on preferably at least the lower mold plate surrounding circumscribingly the mold(s) for facilitating the anchoring of the fabric sheet prior to and during the molding operation of compaction, preferably there being apertures within an upper face of the lower spring-biased plate and also preferably within the lower face of the upper spring-biased plate with the pin mounting positions and pins mounted therein uprightly aligned for extending through the holes, at least before and during mating of the molds, normally and preferably the pins becoming protruded though the lower and upper aligned holes (apertures) when the spring-biased plates come into contact with one-another and becomes pressed recoilingly against the biasing springs.

Although illustrated by simple locking bolts and nuts at each of four corners for the locking-on of the mold plate, together with the spring-biased plate mounted thereon for the lower plate, other locking lever or the like is optionally within the scope of this easily secured mold— as compare to prior machines in which a skilled mechanic was required to make such removal or mounting.

Another particular advantageous feature of the present invention is separate electrical or other control circuits for the selective separately controlled heating of the upper and lower molds, together with separate manually adjustable thermostats, one for each, this being an important feature since it is rare that separate mold heat with the same degree of uniformity, as well as it possibly for particular molding operations being preferred to have one mold hotter than the other, and/or desirable to utilize differing temperatures for different types of fabric sheet, for example synthetics (plastics) as opposed to textile animal or plant materials and/or combinations of one or more of these with the other(s).

By virtue of the circumscribing spring-biased plate for the lower preferably female mold being of a small perimeter to the defined small space surrounding the mold, two advantages are obtained. Firstly, by virtue of there being a very minor and small space between the mold edge of the female portion (for example) there is less tendency for the fabric sheet to sag unduly and to an undesirable extent or to a degree undesirable, or for the fabric sheet accidentally to sag more at one point than another which would result in a tendency to cause the sheet to slip during the mating movement of the molds together when exerting pressure on upper and lower surfaces of the fabric sheet and/or to result in unevenly stretched fabric and resulting possible imperfections. A second advantage is the fact of reduced size of the fabric sheet in area required to mount the fabric sheet properly on top of the lower preferably female mold before the compaction thereof between the opposing molds, thereby substantially reducing the amount of wast peripheral material around the molded portions thereof.

Because preheating of the molds for a period depending upon the size and mass of the mold as conventional operation is required by and in accord with conventional practice, preferably there is provided an actuation switch and circuit therefor separate from the circuit and/or system for the pheumatic operation of the presses for the mold(s) for advancing at least one of the molds toward the other, the separate heating switch making possible the conservation of power during the preheating by actuation of the preheating switch without turning-on the pneumatic circuit; reduced time of activation of the circuit of the pneumatic system also serves to increase the longivity of that circuit by not burning it out through prolonged use when not in actual operation, as well as making it possible to turn-off that part of the machine while keeping-on the heating-element portions. To avoid inadvertent leaving-on of such switches, there also is provided on-off switches and lights associated with each of the pneumatic system and the heating-element systems separate from one another.

A general function of this inventive machine is to mold textile fabrics or plastics by means of pressure and heat, by using preferably aluminum molds with a given shape using a male and female mold each respectively, and applying heat to both, then putting textile or plastic material in-between the male and female molds. Then, by means of air, the top mold preferably is caused to come down and it presses the textile sheet material into the bottom mold by stretching the same; leaving material in the mold for a preselected conventional period of time during the continued mating of the male and female mold in the heated state causes the formed material to set, and thereafter the top mold preferably, is caused to release by moving the same returnably back upwardly. Thereafter the formed material is removed from the mold and the formed material retains the shape of the molds. An important feature of this invention is the molding of the fabric sheet properly in its place as a result of one or both of the circumscribing opposing clamp faces of the spring-biased plates, as well as the fact of the advanced-contact of the spring-biased plates on each of opposite sides of the fabric prior to the stretching beginning to take place, as well as the detachable mounting pins selectively placeable.

It is to be understood that the pneumatic system of the present invention is of a conventional type and does not require any special skill nor disclosure thereof since the prior art relating thereto is hereby incorporated by reference. However, it can be noted that the machine is equipped with a double acting compressed air cylinder, compressed air lines being connected from a valve to both ends of a double acting cylinder. The piston and rod move from starting to applied position by compressed air fed into one end of the cylinder, at the same time air being exhausted at the other end. Next, the reverse action occurs, with the end that was previously fed air now being exhausted. The air cylinder is controlled by a four-way-valve for its operation simultaneously of an air inlet to one end of the cylinder and an exhaust from the other end, as well as complete reversal being required. Five ports usually are provided in a four way valve, namely, one inlet, two cylinder and two exhaust ports. The position of the lever in the four way valve determines which end of the cylinder is being fed air while the other end is being exhausted; moving valve lever then reverses action. Valve lever control is effected by an electric circuit. When the valve is energized, air is passed to the air cylinder; when the valve is deenergized, air is exhausted out of the valve.

Although the connection of a timer in circuit in a manner to perform as above described is a part of a preferred embodiment of the present invention, the nature of the timer is conventional in nature of the prior art types or as desired, and may be used to time a single interval at a pre-set time or for a complete programmed cycle. Time settings are made by turning the knob on the front of the dial. A preferred neon pilot lamp glows when the timer motor is energized, and the release of the activation-maintenance is tripped when the pointer reaches zero whereupon the male mold rises to its beginning position.

For the upright detachable mounting pins discussed above, there preferably are provided mounting positions therefor at five front locations, five back locations, and two side locations for each side.

As noted above, the machine is equipped with a seal automatic safety control, in the form of a module limited switch relay. The operator must actuate both switches preferably within ¼ second or otherwise start anew the activation. The limit switch closes the circuit when the machine reaches the function station of the cycle at which the time operator structure may release the switches. The cycle will continue for the predetermined period after which the machine returns to its starting position automatically ready for restart by the operator. This relay meets safety standards and allows the operator free time to perform other necessary functions; in conjunction with relay, there is an on/off switch which turns on the machine.

There is an automatic switch which connects the relay and timer together, the timer being pre-set for whatever time cycle is needed. When the operator actuates both safety buttons, the relay sets off the air cylinder and timer, and shuts off both when the time cycle is completed.

The time cycle cut-off switch, when placed in the off-position, during the relay automatic timing cycle will cut-off the timer and relay and stop cycle and accordingly will return the machine to its starting position again.

The manual switch, when flipped to the manual position — rather than to the automatic position, will cut off the automatic relay and timer, and will activate an up-down switch, this up-down switch allowing the operator to run the machine up and down without having to press the two safety buttons. The manual is used to lineup the male and female molds and to test material and to make adjustments in the spring frame, and the like.

The heater switch, normally used to turn on a 220 AC voltage current, turns on two heat thermostats that control temperature of heat plates that heat the molds.

In conjunction with each and every one of these switches there is typically associated therewith an indicator such as a neon or other light to show that the switch is on when it is on. Also there would be two 110 volt fuses and a 220 volt fuse typically to protect the unit.

The advantage of the dual button switches that must be separately actuated each with a separate hand, is that both hands are thereby required to activate and continue the press movement downwardly whereby the occupied hands are not able to carelessly become caught in the moving parts nor between the molds during the pressing, thereby avoiding accident by removing the possibility of such a hazard.

The invention may be better understood by reference to the Figures as follow.

THE FIGURES

FIG. 1 illustrates in side-front perspective view a preferred embodiment of the present invention.

FIG. 2 illustrates an elevation front view in an in-part view as taken along lines 2—2 of FIG. 1.

FIG. 3 illustrates a view analogous to that of FIG. 2, except in a pressing state in which the upper male mold has been pressed downwardly mateably on top of the female mold.

FIG. 5A illustrates an exploded in-part side view of an alternate embodiment with partial cut-away.

DETAILED DESCRIPTION OF THE INVENTION

Figure 4:
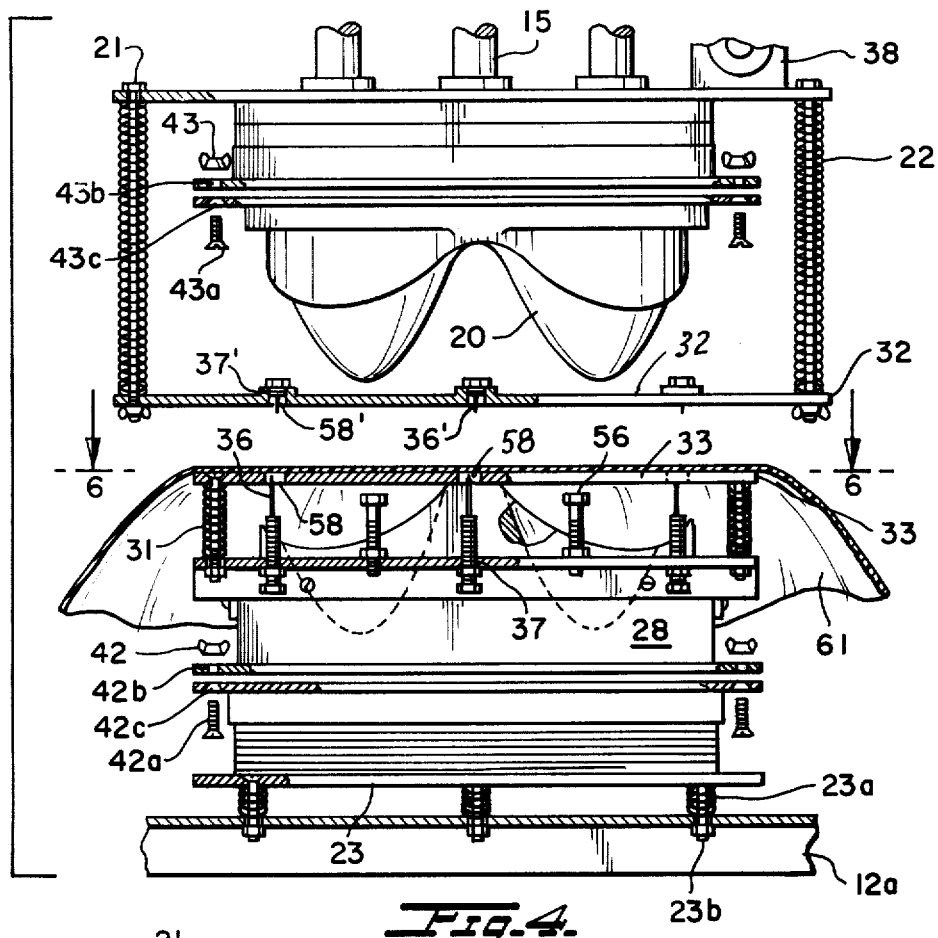
FIG. 4 illustrates an elevation front exploded in-part view in an enlarged representation thereof of a portion of the FIG. 2 embodiment.

In greater detail, FIGS. 1 through 5 illustrate a preferred embodiment of the machine 11 including its support structure of upright leg and wall supports and horizontal lower support 12a and horizontal upper support 12b. The upper front face includes instrument panel 13. From the upper support 12b extend the pneumatic pistons or rods 15 from pneumatic piston cylinders 14 mounted within the support 12b. Supported on the lower end of the pistons 15 is the cylinder plate 16, insulation boards 17, heat plate 25a, and top holding plate 18, and upper mold plate 19 and upper mold 20. For the under or bottom section, there is the lower spring loaded plate 23, the insulation boards 24, the heating plate 25b, the lower holding plate 26, the lower mold plate 27, and the lower female mold 28. The upper spring frame 32 is supported by support rods 21 and spring-biased downwardly by spring 22. The spring frame 33 is mounted on rods 30 and spring-biased upwardly by spring 31 against flange plate 29. Within the spring loaded plates 32 and 33 are apertures 34 and 35 through which the pins 36 are passable during compaction of the plates when the upper mold is lowered, the pins 36 being aligned with the apertures. The pins 36 are detachably mounted at locations 37 in the plate 29. Temperature of the upper mold and heating plate thereof is controlled by the manually adjustable thermostat 38 by the handle 40, and similarly for the lower mold the temperature thereof is controlled by the manual handle 41. The easily detachable and typical attaching mechanism as wing nut 42 secures the lower mold at each of separate corners, while the wingnut 43 secures the upper mold plate at each of four corners. Piston cylinders 14 are activated by activation of the electrical switches of their respective circuits by simultaneously pushing each of buttons 44a and 44b and while the buttons 44a and 44b are simultaneously pushed, the light 45a comes on such as a red light and stays on as long as the buttons 44a and 44b simultaneously continue to be pushed until such time as the upper male mold 20 has mated in the manner shown in FIGS. 3 and 5 at which time the light 45a goes off and the typically yellow or orange light 45b comes on indicating that pressure on the buttons 44a and 44b may be released and that the time cycle of timer 46 has taken over for the period of time as set by handle 47 of the timer during which period of time the female mold will remain pressed downwardly in the mated state prior to the release from that state and return to the up position as indicated in each of FIGS. 2 and 4. The heating elements are turned on by switch 48 and when on the light 49 is turned on. The switch 50 controls on and off for the entire circuit for the cylinders and pistons and the timer, and the light 50b is on when the circuit is on and is off when the circuit is off. Flip toggle switch 51a when flipped upwardly typically indicates by the light 51b that the cylinders and pistons are on automatic operation and will function in conjunction with the timer, whereas when flipped downwardly the light 51b indicates that the operation is on manual. When on manual, as previously discussed, the pistons remain moving downwardly and remain in a downward position only so long as the circuit is manually activated. Flip switch 52a is for a manual regulating of the pistons and molds and typically when flipped in the on position causes the upper male mold to be lowered and the light 52b to come on, and when in the opposite position causes the male mold to rise to its former position and the light to go off. Fuse 52c is for safety of the circuitry. Pneumatic input hose 53 is the feed line furnishing compressed air to the machine 11 through the cleansing device 54 of conventional type (containing oil) well known in the trade. The direction of downward movement of the male mold is indicated by arrow 55.

In the FIG. 4 enlarged embodiment, there is further illustrated wing nuts 42 and 43 as well as the bolts therefor 43a and 43b and the plate apertures 43b and 43c, as well as the corresponding nuts and apertures 42a, 42b and 42c. Also in the spring mounted plates 32 and 33 there are illustrated the apertures 58 and 59 aligned with the upright axis of the pins 36 mounted at points 37. Limit-abutments 56 are adjustably mounted at 57 within the plate 29, for limiting the downward range of movement of the spring-biased plate against the biasing spring when compaction with the upper plate takes place. The fabric 61 is illustrated in each of FIGS. 1 through 5, and may be composed of cotton, or of a synthetic such as polyethylene or the polyglycol polymers or other conventional or desired polymers and/or plastics, alone or in combination with textile material such as cotton, or the like.

Figure 7:
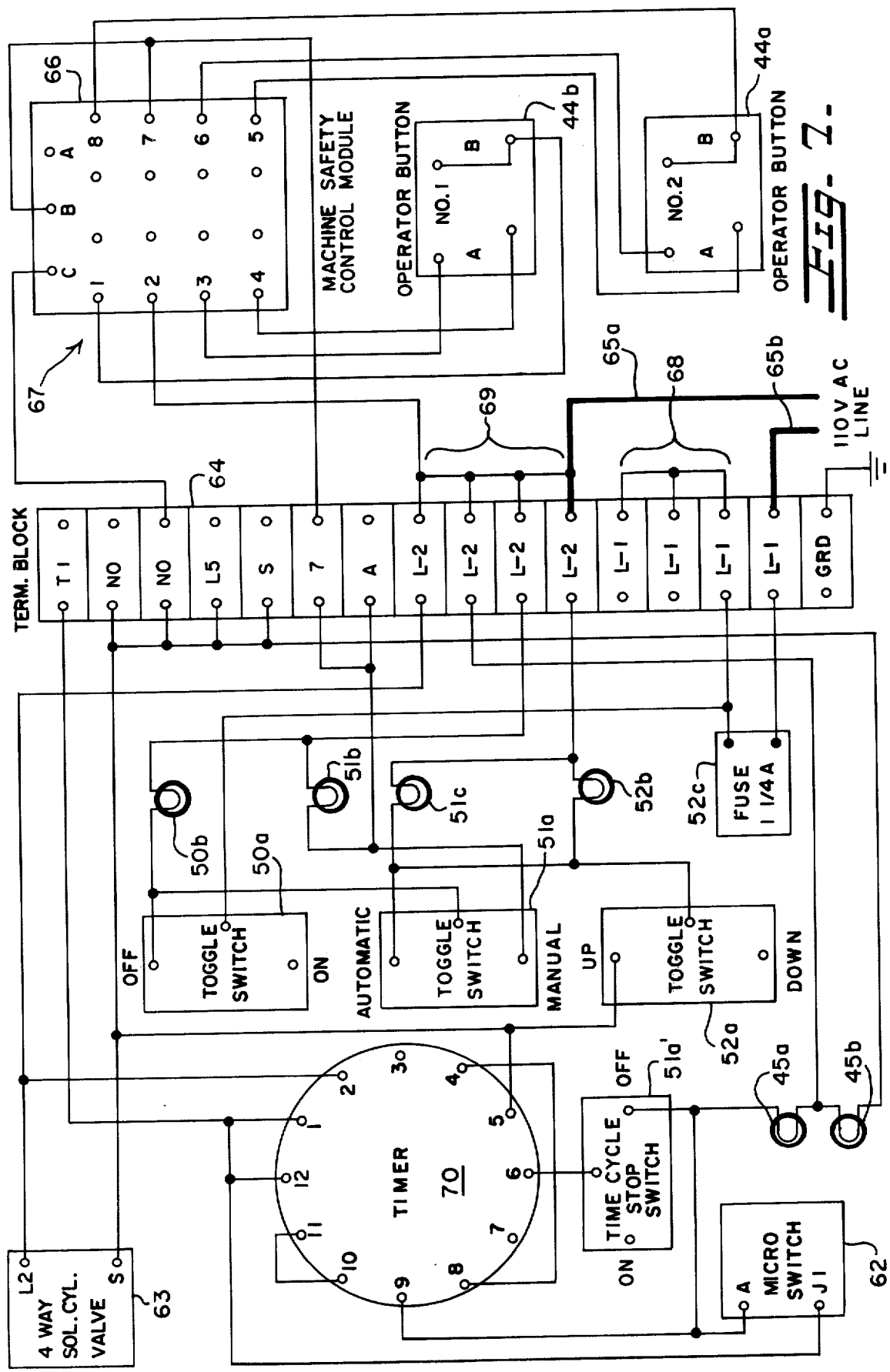
FIG. 7 illustrates a diagrammatic view of the preferred circuitry of FIGS. 1 through 6 embodiments.

As to this same embodiment, FIG. 7 illustrates a typical and preferred circuitry of the FIGS. 1 through 5 embodiment. Typically illustrated are microswitch 62, four-way solenoid cylinder valve 63, the terminal block 64, terminal input leads 65a and 65b L the L−1 and L −2 leads, module 66 and circuitry thereof 67, L −1 for terminal 68 and L −2 for terminal 69, in the timer 70, other panels and indicator lights are numbered as previously indicated in preceding Figures.

In greater detail, 110 AC voltage power supply goes to terminal block terminals 68 and 69, then to the fuse 52c, and then to the off-on panel switch 50a to turn the circuitry on. When the automatic switch is turned on, power supply goes to the automatic relay 51a and to the microswitch 62. When the two two actuation safety buttons 44a and 44b are pressed, the air cylinder piston rods come down and hit microswitch which turns on the timer 70. When the timer completes its time, as preset, the rod returns back to its fixed starting position above. With particular reference to the time cycle stop switch 51a, there is an off-on toggle switch which normally is on the automatic position rather than the manual. The manual switch 52a is for activation of up-down movement of the upper male mold during the adjustment of the molds or other manipulation outside of normal operator operating procedure.

In the illustrated embodiment of FIG. 4, it may be seen that the member 32 has apertures 58' aligned with lower apertures 58 and with the respective upper and lower pins 36' and 36 off-set in non-alignment such that they will be insertable into the opposing aperture as the plates 32 and 33 come together during a molding operation. The pins 36' are mounted in the lower distal end of the screww body 37' and the pins 37' extend axially downwardly therefrom. In each of FIGS. 1 through 6 embodiments, the spring 31 is mounted on the axially slidable upwardly spring-biased shaft 31a, having a securing nut on its lower end typically.

Figure 5:
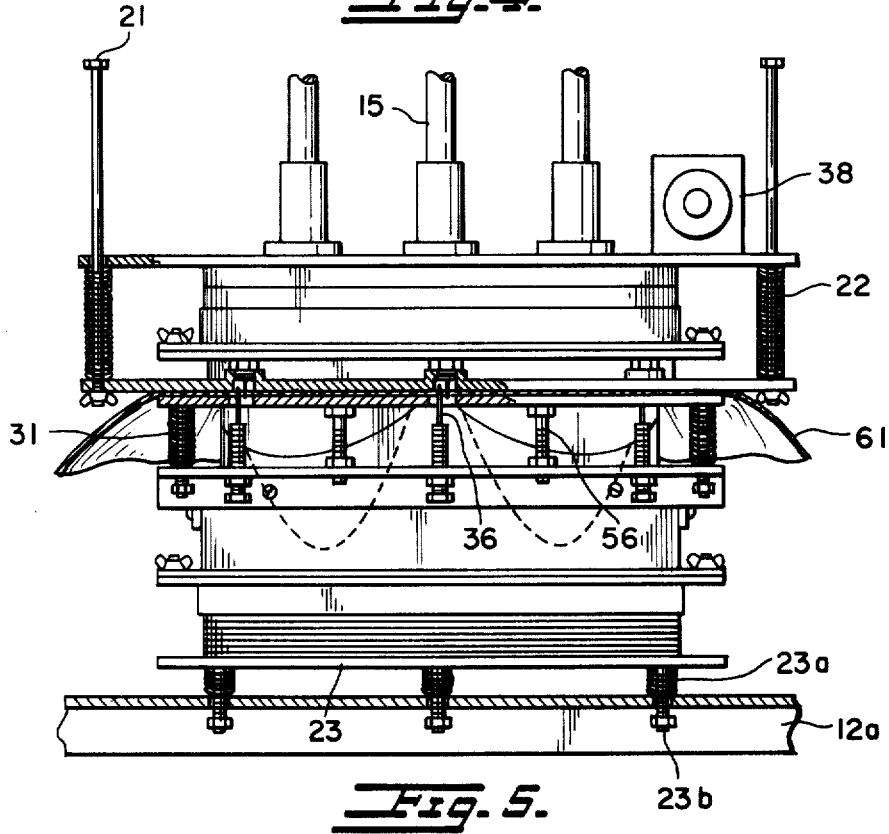
FIG. 5 illustrates an enlarged elevation front view of a portion of the illustrated embodiment of FIG. 3.
Figure 6:
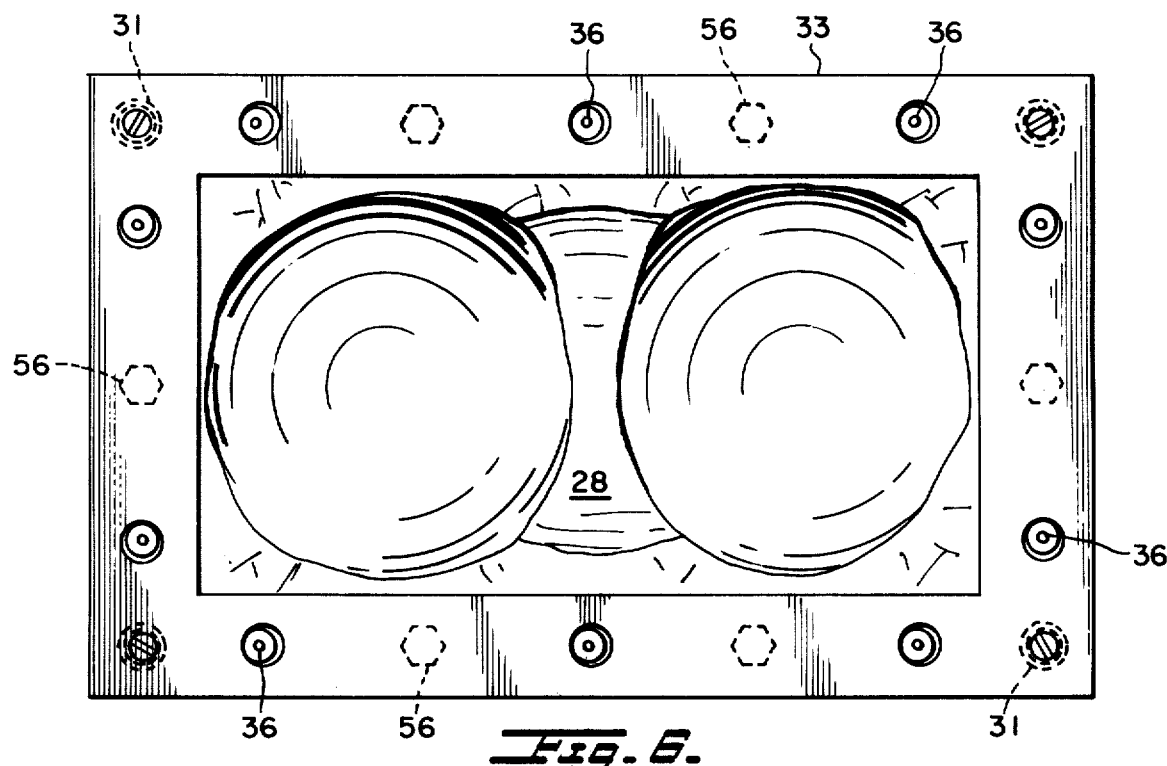
FIG. 6 illustrates an elevation plan view of the embodiment of FIG. 4 as taken along lines 6—6 of FIG. 4.
Figure 6A:
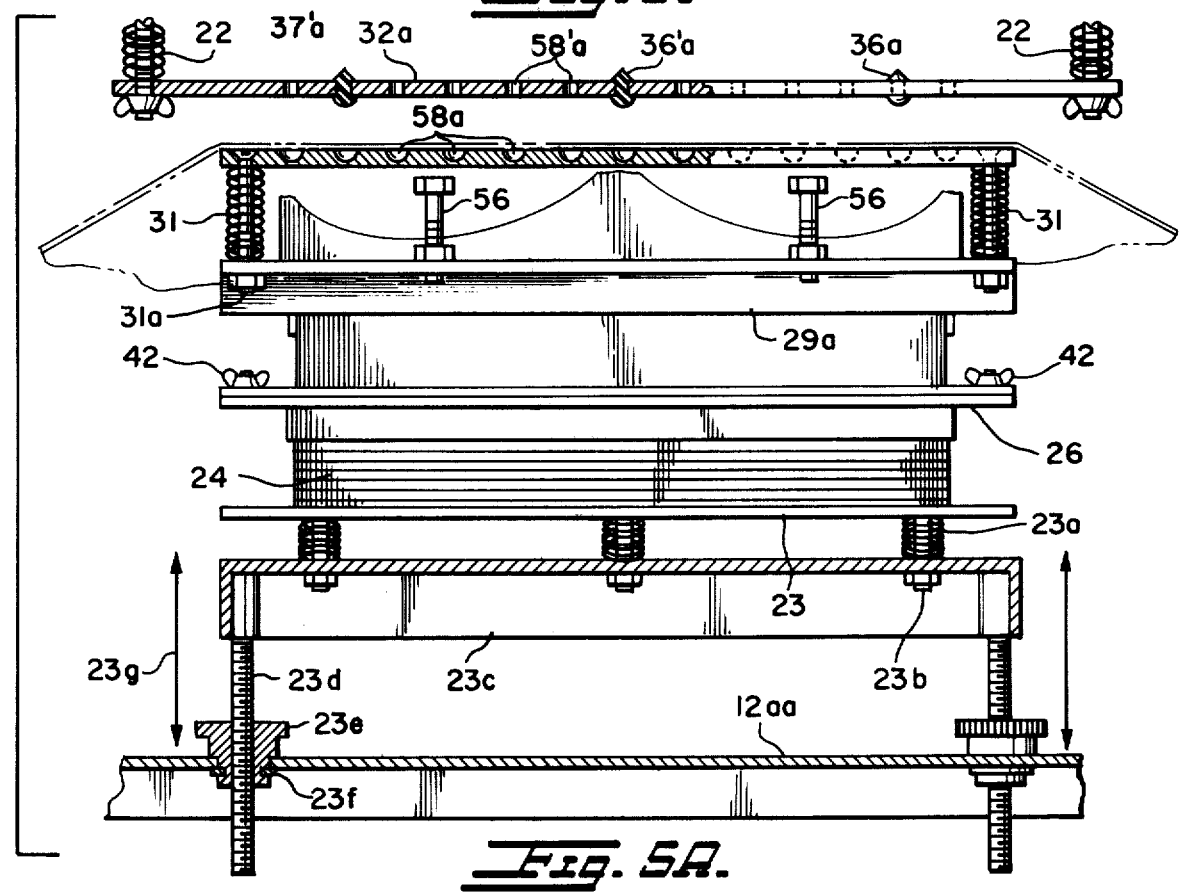

At a lower point, the plate 23 is mounted on the spring 23 of FIGS. 1, 2, 3, 4, and 5, onto the plate 12a, whereas in the FIG. 5A alternate embodiment, spring 23a mounts shaft 23b onto the elevatable and levelable table structure 23c mounted on legs 23d through apertures in rotatable inner core-threaded member 23e revolvably insertably mounted within a hole of base plate 12aa and locked thereinto by keys 23f. Also in this FIG. 5A embodiment, instead of pins, there are alternately provided inserts 36a, having a flanged insert-shaft terminal end for the locking thereof into the hole 58'a of the insert shaft 37'a, the enlarged lower head being snugly mateable within the lower hole or depression 58a. The insert material is preferably heat resistant plastic or rubber or other material preferably of a rough texture which will not permit the fabric to slip from beneath the head when the head is pressed downwardly mateably into the depression 58'a. The legs 23e are preferably located at each of four corners of the plate 23c, for raising or lowering in direction 23g by rotation of respective members 23e.

It is within the scope and spirit of the present invention to make such modifications and substitution of equivalents as would be apparent to a person of ordinary skill in this particular field.

I claim:

1. A brassiere molding machine comprising in combination: a support structure means for supporting each of upwardly facing and downwardly facing opposing male and female molds; each of male and female brassiere mold means mounted in face-to-face opposing relationship, mounted on said support structure means; pneumatic means for controllably reciprocatably advancing and retracting to and fro one of the male and female brassiere mold means toward and away from the other of the male and female brassiere mold means; heating means for controllably heating male and female brassiere mold means; switch means for actuating and for deactivating each of the pneumatic means and the heating means controllably; the improvement being the combination of the above-noted means and said male and female brassiere mold means each defining a mold mateable with the mold of the other and each further defining as secured to its respective mold a substantially horizontally lying support plate, one of the male and female brassiere molds facing upwardly and the other facing downwardly, and the bottom one of the male and female brassiere mold means further defining substantially circumscribing fabric-sheet-mounting means in predetermined snug circumscription of and positioned above the bottom mold for supporting fabric sheet extending in a substantially horizontal plane at a position about even with an upper face of the bottom mold whereby the sheet to be formed may be of small area along its upper and lower faces.

2. A brassiere molding machine of claim 1, the improvement further including: each of said male and female brassiere mold means including detachable mounting means for replaceably mounting the support plate on said support structure means such that quick and simple maneuvers are detachably removable of and attachably mountable of alternate molds whereby interchangable molds are easily utilizable.

3. A brassiere molding machine of claim 2, the improvement further including: said fabric sheet-mounting means including upright pins mounted for securing fabric sheet laid across points thereof against lateral movement of the fabric sheet when the fabric sheet is molded by a pneumatic mating of the male and female molds, said pins being spaced along a peripherary of the lower mold.

4. A brassiere molding machine of claim 3, the improvement further including: said bottom mold being a female mold, and said upper mold being a male mold, the upper brassiere mold means including a downwardly spring-biased substantially horizontal plate structure substantially circumscribing the upper male mold, and aligned beneath the downwardly spring-biased plate an upwardly spring-biased substantially horizontal plate structure substantially circumscribing the lower female mold and defining an upper substantially planar face substantially flushly engageable with a lower substantially planar face of the downwardly spring-biased plate structure such that when the male and female molds are pneumatically mated, the downwardly spring-biased horizontal plate structure and the upwardly spring-biased horizontal plate structure engage in face to face relationship pinable of the fabric sheet therebetween.

5. A brassiere molding machine of claim 4, the improvement further including: said downwardly spring-biased plate being positioned below the male mold's lower-most face when the downwardly spring-biased plate is in its most downwardly biased state.

6. A brassiere molding machine of claim 5, the improvement further including: said upwardly spring-biased plate's upper face including apertures and said pins being positioned in alignment with said apertures such that upon depression of the upwardly spring-biased plate the pins protrude through said apertures.

7. A brassiere molding machine of claim 6, the improvement further including: said switch means including two separate spaced-apart switches jointly actuatable of the pneumatic means for advancing downwardly said male brassiere mold means, said two separate switches being spaced apart a predetermined distance greater than the reach of a human hand's fingers such that a separate human hand must be utilized for each of the two separate switches simultaneously in order to activate the pneumatic means for said advancing.

8. A brassiere molding machine of claim 7, the improvement further including: said pneumatic means including electrical circuitry such that simultaneous activation of said two separate switches is necessary until said molds have become mated, and such that the mated molds are maintainable in the mated state without simultaneous continued activation of both of the two separate switches for a predetermined period of time.

9. A brassiere molding machine of claim 8, the improvement further including: timer means for manual adjustment of the length of said predetermined period of time the molds are mated.

10. A brassiere molding machine of claim 9, the improvement further including: said heating means including separate heating structure and separate thermostats for each of the upper and lower, male and female molds separately from one-another such that each may be heated controllably separate and independently from the other.

11. A brassiere molding machine of claim 10, the improvement further including: indicator means for indicating when an operator may cease to manually activate both of said two separate switches.

12. A brassiere molding machine of claim 11, the improvement further including: said pneumatic means including a speed means for manually adjusting the rate of speed of said advancing male mold means.

13. A brassiere molding machine of claim 12, the improvement further including: said switch means including a separate mold-heating initiation switch and sub-control separate upper and lower mold thermostat control switches such that one or more of the molds may be preheated.

14. A brassiere molding machine of claim 13, the improvement further including: said timer means being detachably insertably mountable for speedy replacement thereof.

15. A brassiere molding machine of claim 14, the improvement further including: said switch means including a switch mechanism for manually activating and de-activating operation of said timer means.

16. A brassiere molding machine of claim 9, the improvement further including: said switch means including a switch mechanism for manually activating and de-activating operation of said timer means.

17. A brassiere molding machine of claim 1, the improvement further including: said bottom mold being a female mold, and said upper mold being a male mold, the upper brassiere mold means including a downwardly spring-biased substantially horizontal plate structure substantially circumscribing the upper male mold, and aligned beneath the downwardly spring-biased plate an upwardly spring-biased substantially horizontal plate structure substantially circumscribing the lower female mold and defining an upper substantially planar face substantially flushly engageable with a lower substantially planar face of the downwardly spring-biased plate structure such that when the male and female molds are pneumatically mated, the downwardly spring-biased horizontal plate structure and the upwardly spring-biased horizontal plate structure engage in face to face relationship pinable of the fabric sheet therebetween.

18. A brassiere molding machine of claim 1, the improvement further including: said switch means including two separate spaced-apart switches jointly actuatable of the pneumatic means for advancing downwardly said male brassiere mold means, said two separate switches being spaced apart a predetermined distance greater than the reach of a human hand's fingers such that a separate human hand must be utilized for each of the two separate switches simultaneously in order to activate the pneumatic means for said advancing.

19. A brassiere molding machine of claim 1, the improvement further including: said heating means including separate heating structure and separate thermostats for each of the upper and lower, male and female molds separately from one-another such that each may be heated controllably separate and independently from the other.

20. A brassiere molding machine of claim 1, the improvement further including: said pneumatic means including a speed means for manually adjusting the rate of speed of said advancing.

* * * * *